(12) United States Patent
Diehl

(10) Patent No.: US 11,258,587 B2
(45) Date of Patent: Feb. 22, 2022

(54) BLOCKCHAIN-BASED DIGITAL RIGHTS MANAGEMENT

(71) Applicants: SONY CORPORATION, Tyokyo (JP); SONY PICTURES ENTERTAINMENT INC., Culver City, CA (US)

(72) Inventor: Eric Diehl, Culver City, CA (US)

(73) Assignees: Sony Corporation, Tokyo (JP); Sony Pictures Entertainment Inc., Culver City, CA (US)

( * ) Notice: Subject to any disclaimer, the term of this patent is extended or adjusted under 35 U.S.C. 154(b) by 52 days.

(21) Appl. No.: 15/458,807

(22) Filed: Mar. 14, 2017

(65) Prior Publication Data

US 2018/0115416 A1   Apr. 26, 2018

Related U.S. Application Data

(60) Provisional application No. 62/410,557, filed on Oct. 20, 2016.

(51) Int. Cl.
| | | |
|---|---|---|
| *G06F 21/10* | (2013.01) | |
| *G06F 21/64* | (2013.01) | |
| *H04L 9/08* | (2006.01) | |
| *H04L 9/30* | (2006.01) | |

(52) U.S. Cl.
CPC ............ *H04L 9/0819* (2013.01); *G06F 21/10* (2013.01); *H04L 9/0838* (2013.01); *H04L 9/30* (2013.01)

(58) Field of Classification Search
CPC ....... H04L 9/0819; H04L 9/0838; H04L 9/30; G06F 21/10
See application file for complete search history.

(56) References Cited

U.S. PATENT DOCUMENTS

| | | | |
|---|---|---|---|
| 6,824,051 B2 | 11/2004 | Reddy et al. | |
| 8,751,800 B1 * | 6/2014 | Dorwin ................ | H04L 47/801 713/167 |
| 8,793,193 B2 | 7/2014 | Sorotokin et al. | |

(Continued)

FOREIGN PATENT DOCUMENTS

| | | | | |
|---|---|---|---|---|
| EP | 3399458 A1 * | 11/2018 | ........... | H04L 9/0819 |
| JP | 2002312058 A | 10/2002 | | |

(Continued)

OTHER PUBLICATIONS

Junichi Kishigami; Shigeru Fujimura; Hiroki Watanabe; Atsushi Nakadaira; Akihiko Akutsu; "The Blockchain-Based Digital Content Distribution System"; 2015 IEEE Fifth International Conference on Big Data and Cloud Computing; Year: 2015 | Conference Paper | Publisher: IEEE; pp. 187-190 (Year: 2015).*

(Continued)

*Primary Examiner* — Shewaye Gelagay
*Assistant Examiner* — Courtney D Fields
(74) *Attorney, Agent, or Firm* — Procopio, Cory, Hargreaves & Savitch LLP

(57) ABSTRACT

Generating a rights blockchain storing rights of a user, including: receiving an enrollment request and a public key from the user; verifying that the user has a private key corresponding to the public key; generating a user identifier using the public key; and generating and delivering the rights blockchain having a genesis block including the user identifier to the user.

13 Claims, 9 Drawing Sheets

(56) References Cited

U.S. PATENT DOCUMENTS

| | | | |
|---|---|---|---|
| 2015/0127940 A1* | 5/2015 | Polehn | H04L 63/0435 |
| | | | 713/168 |
| 2015/0278820 A1 | 10/2015 | Meadows | |
| 2015/0332283 A1 | 11/2015 | Witchey | |
| 2016/0028552 A1 | 1/2016 | Spanos et al. | |
| 2016/0275461 A1* | 9/2016 | Sprague | G06Q 20/0655 |
| 2016/0292680 A1 | 10/2016 | Wilson, Jr. | |
| 2016/0328713 A1 | 11/2016 | Ebrahimi | |
| 2017/0279783 A1* | 9/2017 | Milazzo | B29C 64/00 |
| 2018/0068091 A1* | 3/2018 | Gaidar | G06F 21/10 |

FOREIGN PATENT DOCUMENTS

| | | | |
|---|---|---|---|
| JP | 2005539441 A | 12/2005 | |
| JP | 2006268574 A | 10/2006 | |
| JP | 2011244213 A | 12/2011 | |
| KR | 1020150144645 A | 12/2015 | |

OTHER PUBLICATIONS

International Search Report and Written Opinion issued in copening PCT Application No. PCT/US2017/046906 dated Oct. 27, 2017 in 11 pages.

Kohei Miura et al. Privacy Preserving Digital Content Circulation System Using Bitcoin 2.0 Communication Engineers, Japan Electronics, Information and Communication Engineers General Corporation, May 26, 2016, vol. 16, No. 71. pp. 29-32.

Office Action dated Feb. 5, 2020, for related Application No. JP2019-542345 in 13 pages.

Office Action dated Oct. 18, 2019 for related Application No. PCT/US2017/046906 in 7 pages.

Fujimura Shigeru et al: "BRIGHT: A concept for a decentalized rights management system based on blockchain", 2015 IEEE 5th International Conference on Consumer Electronics—Berlin (ICCE—Berlin), IEEE, Sep. 6, 2015 (Sep. 6, 2015), pp. 345-346, XP032855135, DOI: 10.1109/ICCE-BERLIN.2015.7391275 [retrieved on JJan. 25, 2016].

Block chain and financial transactions 淵田康之, ブロックチェーンと金融取引の革新, 野村資本市場クォータリー, 株式会社野村資本市場研究所, 2015 年 11 月 Jan. 号 2015年秋号 第 19 巻第 Feb. 号, pp. 11-35.

Office Action dated Sep. 9, 2020, for related Application No. JP2019-542345 in 4 pages.

Mastering Bitcoin, URL: https://www.oreilly.com/library/view/masteringbitcoin/9781491902639/ch07.html#_the_genesis_block, Retrieved on: Jan. 22, 2021.

* cited by examiner

BLOCKCHAIN-BASED DIGITAL RIGHTS MANAGEMENT

CROSS-REFERENCE TO RELATED APPLICATIONS

This application claims the benefit of priority under 35 U.S.C. § 119(e) of U.S. Provisional Patent Application No. 62/410,557, filed Oct. 20, 2016, entitled "Blockchain-Based DRM." The disclosure of the above-referenced application is incorporated herein by reference.

BACKGROUND

Field of the Disclosure

The present disclosure relates to digital rights management (DRM), and more specifically, to implementing the DRM using blockchains.

Background

For interoperability, many current DRM solutions typically require a rights locker or other common storage that is managed by a vendor or a group of vendors. However, these conventional solutions may not be very reliable and rely on one unique point of failure. If the rights locker provider or system goes out of business or otherwise fails, the user loses all the acquired content.

Many interoperable solutions today are based on a common architecture that stores the usage rights of a piece of content into a license dedicated to one user and one specific platform. For example, one common solution for rights locker and management is UltraViolet™.

SUMMARY

The present disclosure provides for implementing an interoperable digital rights management (DRM) using a rights blockchain.

In one implementation, a method for generating a rights blockchain storing rights of a user is disclosed. The method includes: receiving an enrollment request and a public key from the user; verifying that the user has a private key corresponding to the public key; generating a user identifier using the public key; and generating and delivering the rights blockchain having a genesis block including the user identifier to the user.

In another implementation, a system for generating a rights blockchain storing rights of a user is disclosed. The system includes: a registration authority configured to receive an enrollment request and a public key from the user, the registration authority also configured to verify that the user has a private key corresponding to the public key, generate a user identifier using the public key, and generate and deliver the rights blockchain having a genesis block including the user identifier to the user.

In yet another implementation, a method for performing digital rights management using a rights blockchain storing rights of a user is disclosed. The method includes: receiving a protected content including a content identifier, a scrambled essence, and an encrypted control word; receiving the rights blockchain and credentials of the user; searching the rights blockchain for a first block that contains the content identifier of the protected content; decrypting the encrypted control word when a signature and usage rights in the first block are determined to be valid; and descrambling the scrambled essence using the decrypted control word.

In a further implementation, a method for generating a rights blockchain storing rights of a user to consume an item of content is disclosed. The method includes: receiving an enrollment request and a public key from the user and verifying that the user has a private key corresponding to the public key; generating a genesis block including a user identifier of the user using the public key; and generating and adding a new block having a content identifier of the item of content and associated usage rights.

Other features and advantages should be apparent from the present description which illustrates, by way of example, aspects of the disclosure.

BRIEF DESCRIPTION OF THE DRAWINGS

The details of the present disclosure, both as to its structure and operation, may be gleaned in part by study of the appended drawings, in which like reference numerals refer to like parts, and in which.

DETAILED DESCRIPTION

Figure 1:
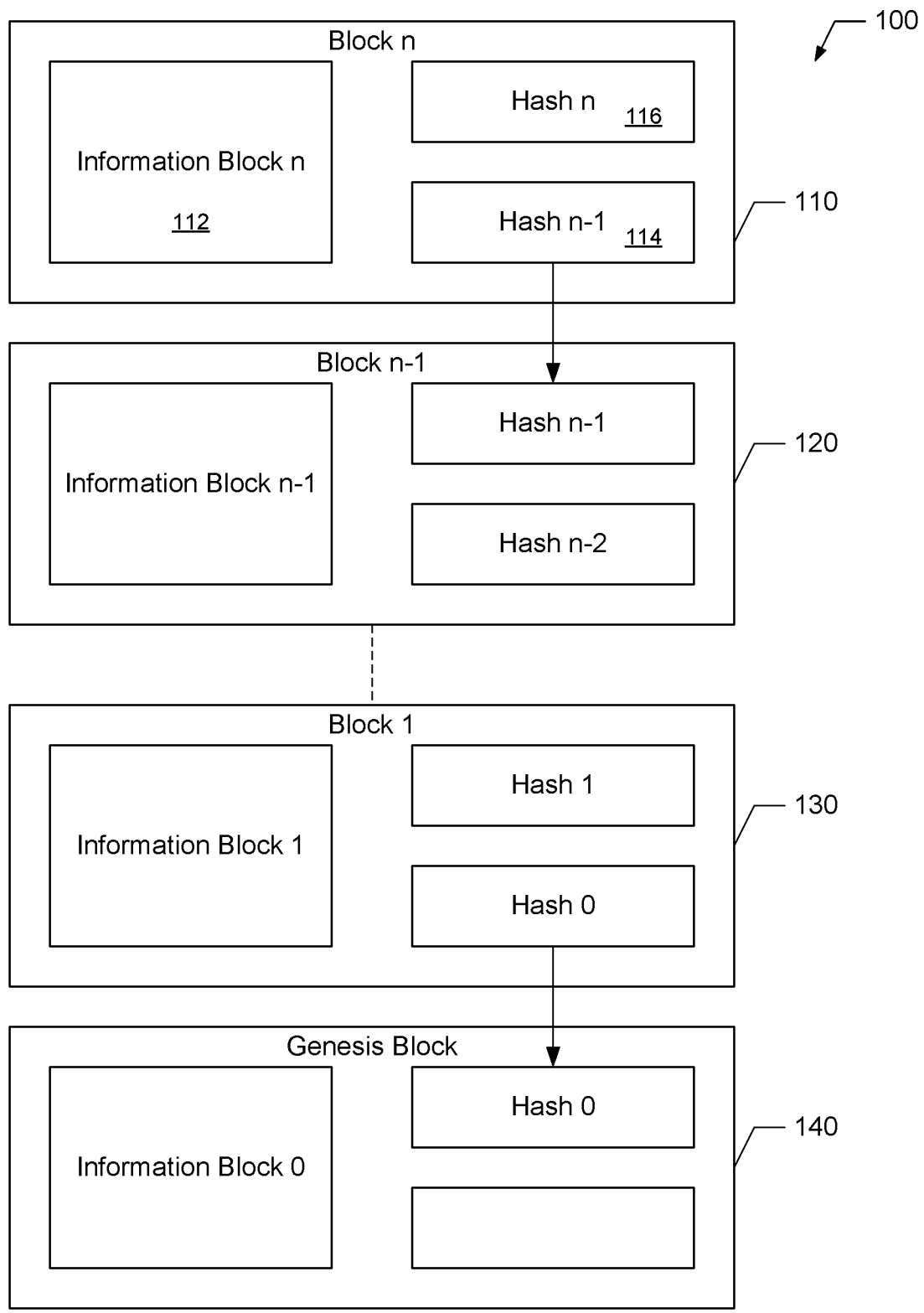
FIG. 1 is a block diagram of a blockchain including n blocks and a genesis block.

As described above, many current digital rights management solutions typically require a rights locker or other common storage, which rely on one unique point of failure. For example, if the rights locker provider or system goes out of business or otherwise fails, the user loses all the acquired content. Conventional solutions store the usage rights of a piece of content into a license dedicated to one user and one specific platform.

Certain implementations of the present disclosure provide an alternative solution which removes the rights locker and offers a persistent interoperability perspective using a blockchain. After reading these descriptions, it will become apparent how to implement the disclosure in various implementations and applications. However, although various implementations of the present disclosure will be described herein, it is understood that these implementations are presented by way of example only, and not limitation. As such, this detailed description of various implementations should not be construed to limit the scope or breadth of the present disclosure.

A blockchain data structure is an ordered list of blocks. Each block points back securely to its predecessor until the first block in the blockchain, usually referred to as the "genesis" block. The blocks and their sequencing are protected in integrity by backward-linking cryptographic hashes.

In one implementation, several computer systems executing software applications and operating systems interact to manage access to content, such as video content stored as data. The computer systems use rights blockchains to manage access. The rights blockchain includes an ordered sequence of blocks of data, storing information for a user and items of content. Initially, the rights blockchain includes a single block, so called the genesis block, storing user information. As usage rights to content items are acquired, blocks are added to the rights blockchain, wherein each new block indicates usage rights to one or more content items and includes a reference to the previous block in the rights blockchain.

In one example, a user has registered user information with a registration computer system and the registration system has provided to a user computer system data representing the genesis block of a rights blockchain. When the user acquires rights to an item of content from a content provider or some other entity, the user system provides the user's rights blockchain to a content provider computer system, and the content provider system and registration system update the user's rights blockchain to reflect the new rights, adding a new block for the new content. The content provider system returns the updated rights blockchain and corresponding encrypted content data representing the content item, and the user system stores the received data. When the user acquires additional usage rights, the content provider system and registration system update the user's rights blockchain again, adding new blocks for new content.

When the user wants to access the content data, the user system provides the content data and the rights blockchain to a DRM computer system. The DRM system verifies the rights blockchain and confirms that the access is within the usage rights granted within the corresponding block in the rights blockchain. Once verified and confirmed, the DRM system decrypts or facilitates decrypting the encrypted content data and the user system can access the decrypted content.

FIG. 1 is a block diagram of a blockchain 100 including n blocks 110, 120, 130 and a genesis block 140. In one implementation, a block has at least three elements: an information section (e.g., 112) that stores the registered data and ancillary data; the cryptographic hash (e.g., 114) of the previous block (the genesis block will not have a previous block); and the cryptographic hash (e.g., 116) of the current block.

Figure 2:
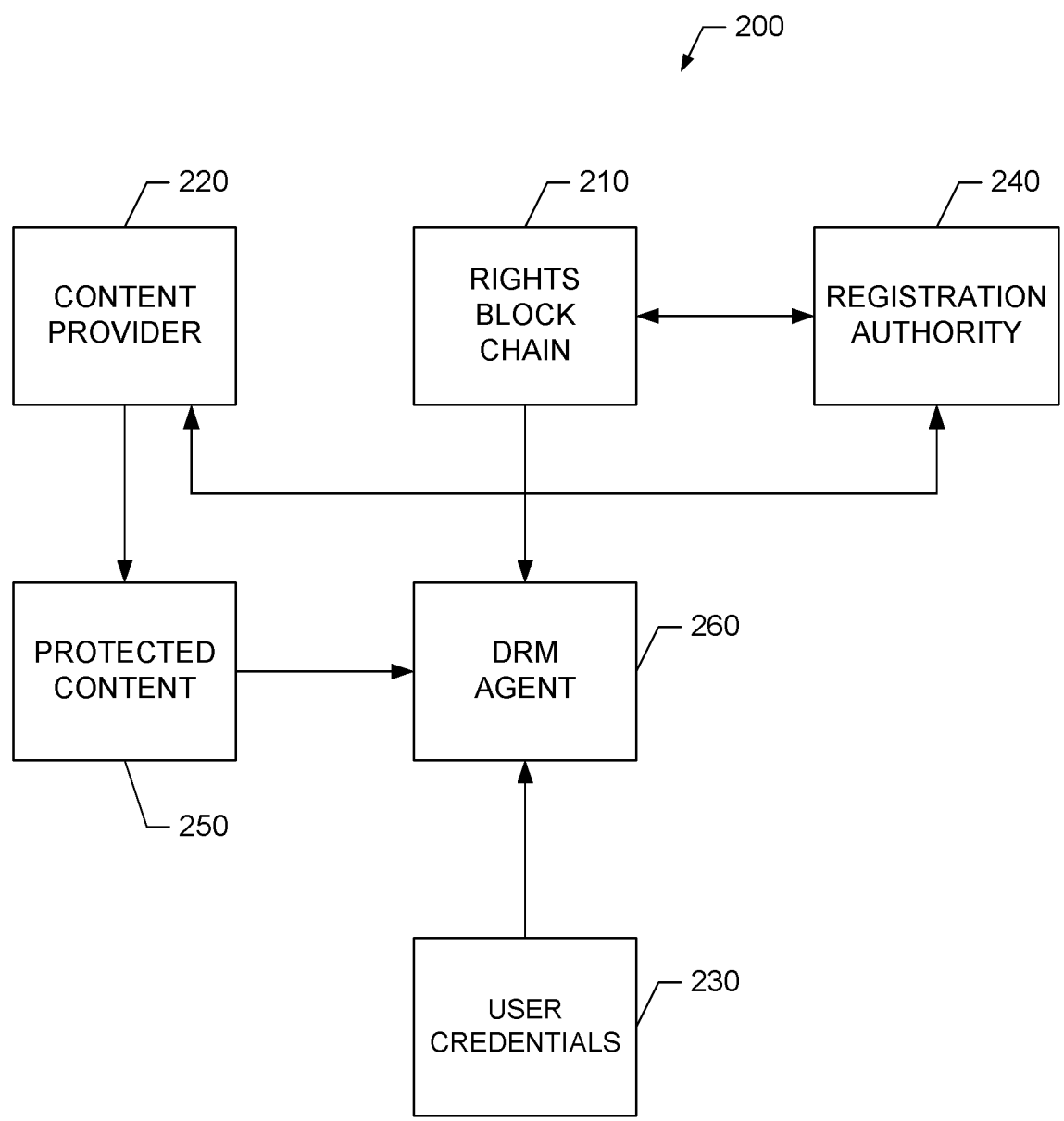
FIG. 2 is a block diagram of the components and interaction in one implementation of a new DRM system using a blockchain.
Figure 3:
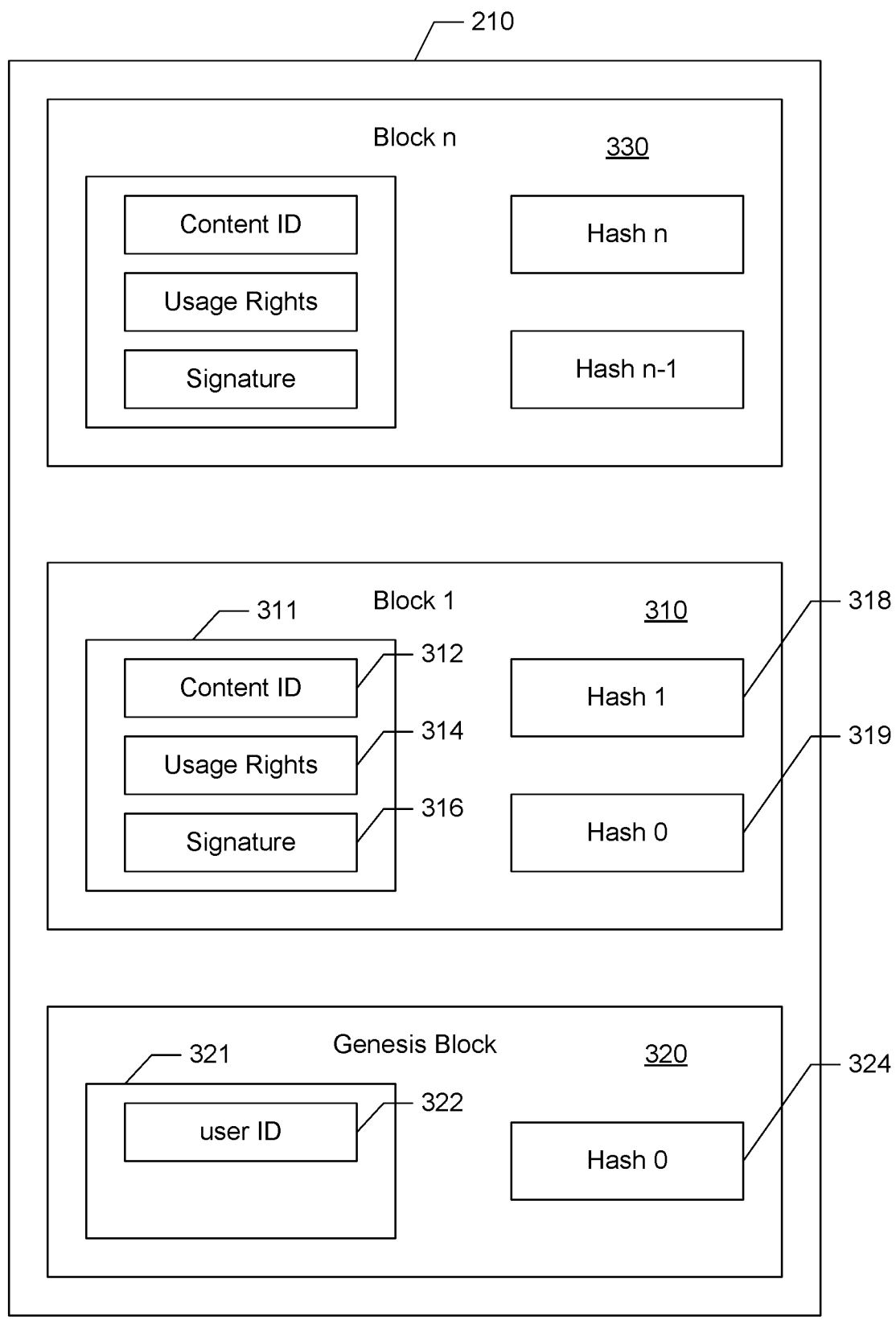
FIG. 3 is a block diagram of one implementation of a rights blockchain (RBC)

FIG. 2 is a block diagram of the components and interaction in one implementation of a new DRM system 200 using a blockchain. A license encrypted for the user/device, in traditional DRM, contains both the descrambling key and the usage rights associated with a piece of content or a set of pieces of content. In the new system 200, the license is replaced by a block in an RBC 210 that holds all the usage rights acquired by a user. This blockchain 210 is not protected in confidentiality, but only in integrity. FIG. 3 is a block diagram of one implementation of the RBC 210.

In the illustrated implementations of FIGS. 2 and 3, the DRM system 200 includes an RBC 210, a content provider 220, user credentials 230, a registration authority 240, protected content 250, and a DRM agent 260. In other implementations, not all entities or objects/data shown in FIG. 2 are needed or used.

The user credentials 230 are unique to the user and are cryptographically linked to a user ID (e.g., the user ID 322 of FIG. 3) of the RBC 210. The registration authority 240 adds new blocks to the user's RBC 210. The content provider 220 distributes the protected content 250, as well as associated usage rights, to the user. The registration authority 240 adds the usage rights to the user's RBC 210. The protected content 250 contains the scrambled content (e.g., a scrambled movie). The DRM agent 260 handles the digital rights management function. In one implementation, the DRM agent 260 operates in the user device used to consume/watch the content. The DRM agent 260 receives the protected content 250 and the RBC 210. If the user is entitled to access the content, the DRM agent 260 descrambles the protected content 250.

In one implementation, each unit of the computer systems are separate (e.g., the content provider 220, registration authority 240, and the DRM agent 260). In another implementation, the computer systems can be co-located or combined (e.g., the content provider 220, registration authority 240 operating on the same server system), or additional systems not shown in the figures can participate (e.g., multiple user systems, such as mobile phone and/or tablet, and multiple content distribution network systems).

In the illustrated implementation of FIG. 3, the information block 321 of the genesis block 320 holds at least the user ID 322. The user ID 322 may be anonymous, as the RBC 210 may be public. The User ID 322 is not confidential. The genesis block 320 also includes a hash 324 of its information block 321. The subsequent block (e.g., Block 1 (310)) also includes a hash 318 of the current block and a hash 319 of the preceding block.

The information block (e.g., 311 for Block 1) of the subsequent blocks (Block 1 (310), . . . , Block n (330)) includes at least the content identifier (ID) (e.g., 312 for Block 1), the usage rights (e.g., 314 for Block 1), and the digital signature (e.g., 316 for Block 1).

The content ID 312 unambiguously identifies one piece of content or work. The work may be a given version of a content, or it may be the content itself regardless of the formats. The content provider 220 controls and defines the content ID 312. The usage rights 314 define the rights the user has been entitled or acquired for this work. The format may be either a standardized rights language such as eXtensible Rights Markup Language (XrML) or Open Digital Rights Language (ODRL), a smart contract, or any proprietary format. A digital signature 316 is issued by the registration authority 240. The signature 316 encompasses the information block 311.

In one implementation, the RBC 210 is unique to an individual identified by the user ID 322. In another implementation, there is a global RBC that holds the usage rights of all users of a given ecosystem. In that case, the block information would also contain the user ID 322, and the genesis block 320 would be different (not dedicated to a specific user ID).

In one example implementation, the blockchain uses the following information and format: the user ID 322 is a 2048-bit number that is provided by the registration authority 240 when the user enrolls and creates the genesis block 320; the content ID (110) uses the Entertainment Identifier Registry (EIDR) identifier for the content (see, e.g., eidr.org); the usage rights (e.g., rights 314) is a data structure listing the list of licensed audio languages and the list of licensed subtitles; and all the hashes (e.g., hashes 318, 319, 324) are SHA-512 coded in base64. For block$_n$, the signature (e.g., signature 316 for block 1) is an RSA 2048 (Rivest, Shamir, and Adelmana; a public-key cryptosystem) of the three fields content ID (e.g., 312), usage rights (e.g., 314), and the hash (e.g., 319) of the block$_{n-1}$. The registration authority 240 generates the signature using its root signing private key. For the genesis block, the signature is an RSA 2048 of the field user ID (e.g., 322). The hash (e.g., 318, 314) of a block encompasses the information block 311 and the hash of the previous block (e.g., 319). The hash 324 of the genesis block 320 encompasses only the information block 321.

Figure 4:
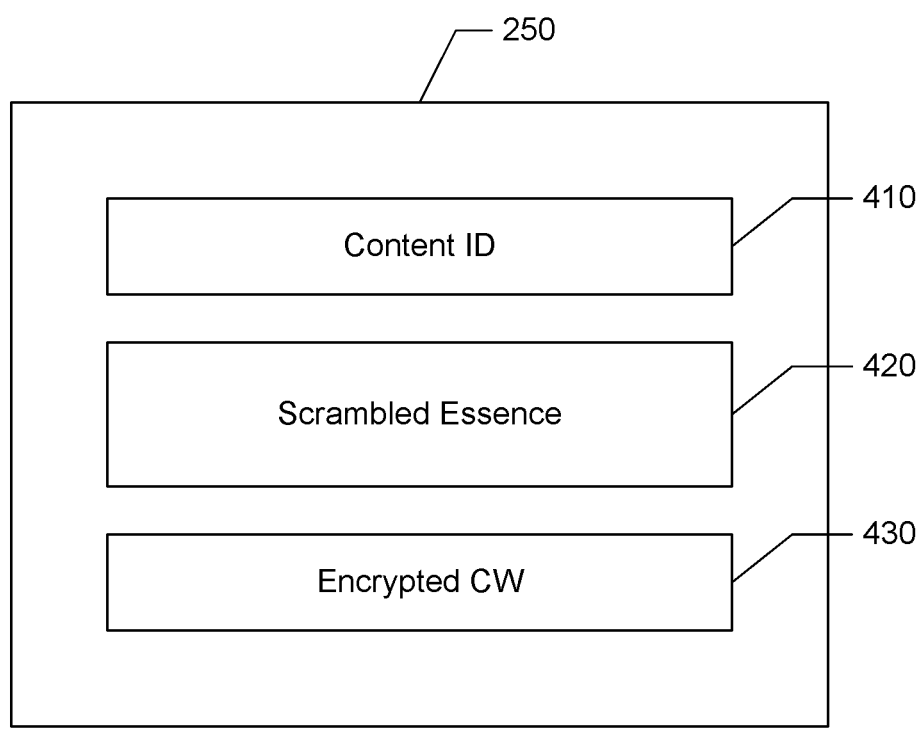
FIG. 4 is a block diagram of one implementation of protected content.

FIG. 4 is a block diagram of one implementation of protected content 250. The protected content 250 includes at least the content ID 410, the scrambled essence 420, and the encrypted control word (encrypted CW) 430. The content ID 410 identifies the work. It is the same as the one used by the RBC 210. The scrambled essence 420 is the result of scrambling the clear essence of the content (i.e., the content in clear form, without scrambling) using a control word (CW), which is a random number generated by the content provider 220. In one implementation, the scrambling algorithm is AES 128-bit in CBC mode. That is scrambled essence=AES$_{(CW)}$ (clear essence). The encrypted CW 430 is the outcome of the encryption of the CW (used to scramble this essence) with a key known to the DRM agent 260 (e.g., using a secret key, or a public key-private key pair).

In one implementation, the DRM agent 260 has a unique 128-bit DRM_KEY that is used to encrypt the CW and the encryption uses Advanced Encryption Standard (AES). In one implementation, the CW is a 128-bit nonce generated by a random number generator. That is, Encrypted CW= AES$_{(DRM\_KEY)}$ (CW).

In one implementation, the content provider 220 may use several DRM technologies. In that case, each supported DRM agent 260 is identified by a DRM-ID. The data structure for the protected content 250 contains a list of pairs of DRM-ID and corresponding encrypted CW 430. Each encrypted CW 430 is the CW encrypted by the secret DRM_KEY of the corresponding DRM agent 260.

Figure 5:
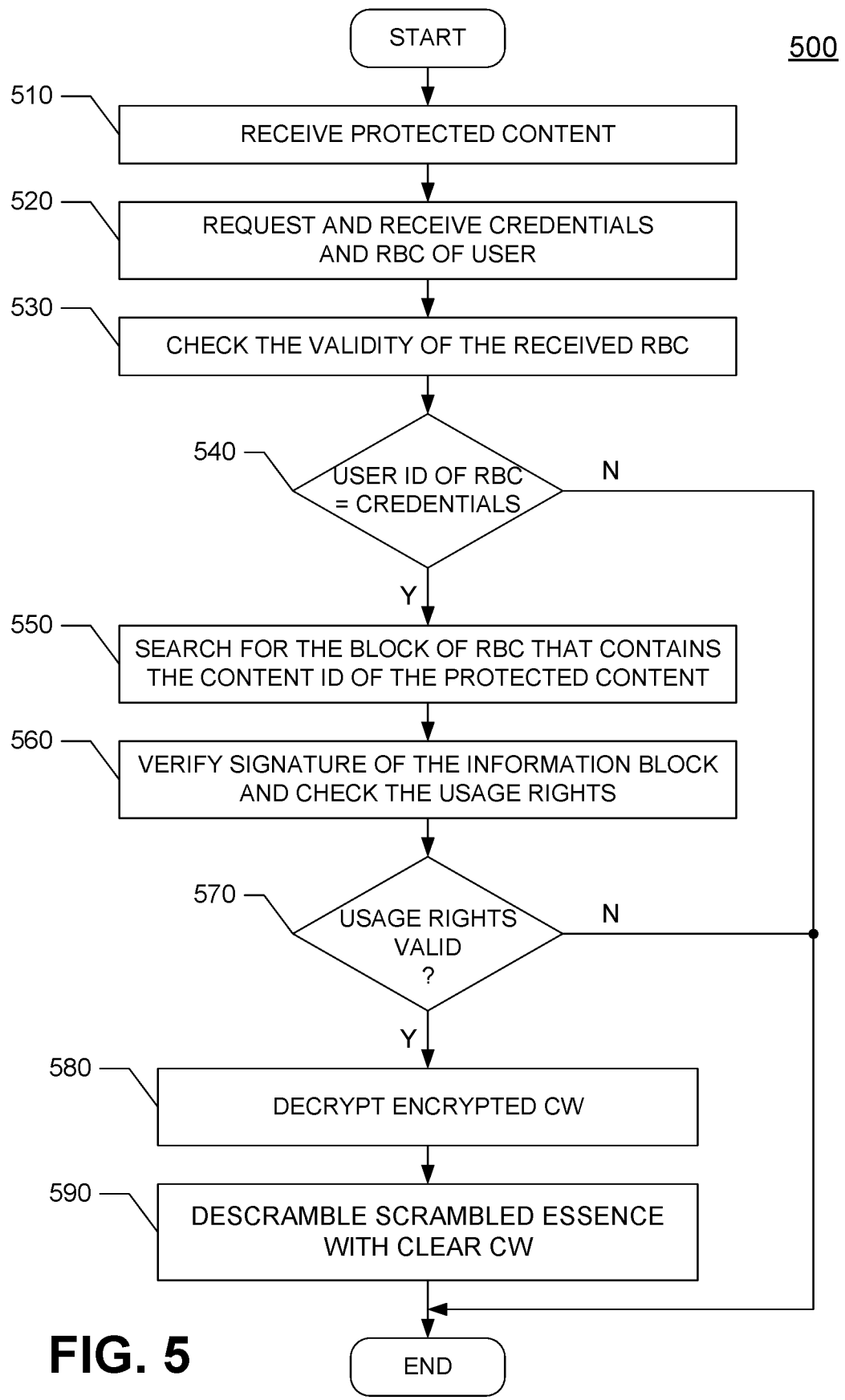
FIG. 5 is a flow diagram illustrating a digital rights management operation using a blockchain in accordance with one implementation of the present disclosure.

FIG. 5 is a flow diagram 500 illustrating a digital rights management (DRM) operation using a blockchain in accordance with one implementation of the present disclosure. In one implementation, the DRM operation is performed within the DRM agent 260 of FIG. 2.

In the illustrated implementation of FIG. 5, the protected content 250 is received, at block 510. The user's credentials 230 and a pointer to the users' RBC 210 are requested and received, at block 520. The validity of the received RBC 210 is checked, at block 530. The validity of the RBC 210 is checked by determining whether the hashes (e.g., hashes 318, 319 for block 1 in FIG. 3) of every block and the hash (e.g., hash 324 for the genesis block in FIG. 3) of the genesis block are consistent. For each non-genesis block, the validation verifies that the calculated hash of this block is equal to hash 318, and that the calculated hash of previous block is equal to hash 319. For the genesis block, the validation verifies that the calculated hash of this block is equal to hash 324.

A determination is then made to verify that the received RBC 210 actually belongs to the user. In one implementation, a check is made, at block 540, to determine whether the user ID 322 in the RBC 210 corresponds to the received user credentials 230. If this is the case, it can be determined that all usage rights (e.g., rights 314 in block 1 of the RBC 210 in FIG. 3) listed in the received RBC are associated with the user.

Once it is determined that the received RBC are associated with the user, the block in the RBC that contains the content ID for the protected content is searched, at block 550. Then, in the corresponding searched block, the signature of the information block and the usage rights are checked, at block 560. If the usage rights are determined, at block 570, to be valid, the encrypted CW 430 is decrypted with a secret key (i.e., DRM_KEY), at block 580, and the clear CW is retrieved. At block 590, the scrambled essence is descrambled with the clear CW.

In the illustrated implementation of FIG. 5, a blockchain DRM operation does not use a centralized license server or a centralized rights locker. Instead of a rights locker, the association of the RBC 210 and the registration authority 240 is used. Similarly, the role of the license server is shared between the RBC 210 that defines the required usage rights, the protected content 250 that holds the encrypted CW 430, and the DRM agent 260 that enforces the usage rights.

Many content providers can share the same RBC. In one implementation, the user has one RBC and each content provider uses the same RBC for that user. In another implementation, a user can have multiple RBCs, one for each content provider or multiple providers can share or use the same RBCs or a content provider can use multiple RBCs.

If a content provider 220 adds or changes its DRM technology, it has just to reissue a new version of the protected content 250 with the new encrypted CW 430 for the new DRM agent 260.

One implementation is designed to handle E-sell through (EST). The user acquires the license rights to watch a content in a given language (or set of languages) and with potential subtitles in a particular language (or set of languages). The license is perpetual (or at least for a reasonable number of years) and is independent of the quality of the viewed instance of the content. In one such implementation, the content provider 220 uses one single DRM.

A few examples of a DRM operation is presented below for user A interacting with systems using RBC.

To create the RBC, user A performs the user enrollment by generating an RSA 2048 key pair and contacting the registration authority 240. The registration authority 240 then performs the following operations: requests the user A's public key; verifies whether this public key is already registered; requests user A to generate a different key pair if the key is already registered; verifies whether user A has the corresponding private key through a challenge-response protocol; creates the user ID 322 with the user A's public key; creates the user A's genesis block 320 for the user A's RBC 210; and delivers the created genesis block 320 to user A.

Figure 6:
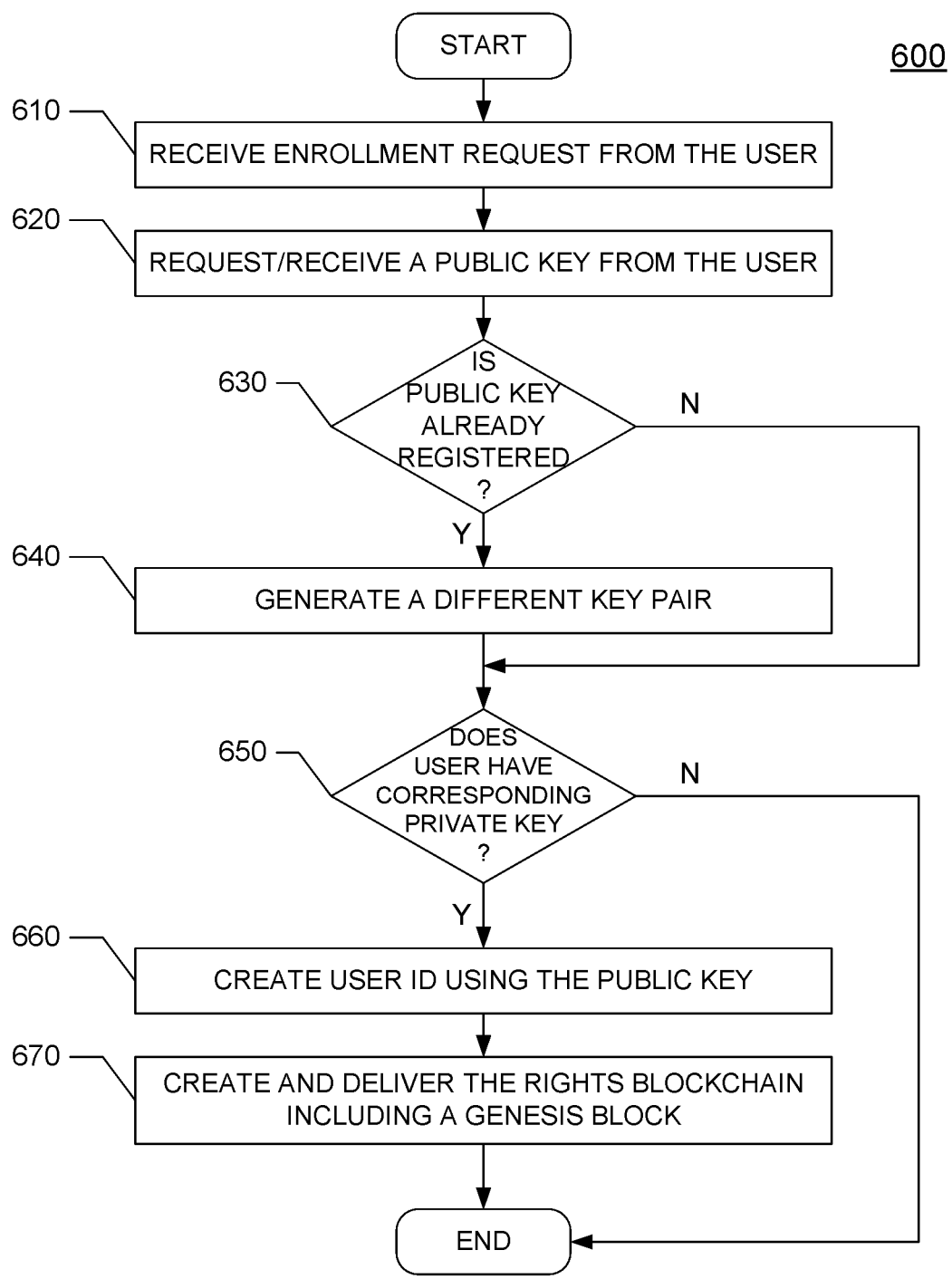
FIG. 6 is a flow diagram illustrating a process for generating an RBC in accordance with one implementation of the present disclosure.

FIG. 6 is a flow diagram 600 illustrating a process for generating an RBC in accordance with one implementation of the present disclosure. In the illustrated implementation of FIG. 6, an enrollment request is received at a registration authority from a user, at block 610. In response, the registration authority requests a public key from the user, at block 620, and verifies, at block 630, whether this public key is already registered. At block 640, the registration authority requests the user to generate a different key pair if the key is already registered. The registration authority then verifies whether the user has the corresponding private key through a challenge-response protocol, at block 650, creates a user ID with the user's public key, at block 660, creates and delivers the rights blockchain with a genesis block for the RBC to the user, at block 670.

To acquire a given content and add usage rights, following operations are performed: user A provides the RBC to the content provider 220; the content provider 220 informs the registration authority 240 that user A acquired the content; the user (or the content provider 220) provides the RBC 210, the content ID (e.g., ID 312 for block 1) of the purchased content, and the associated usage rights (e.g., ID 314 for block 1) such as the list of licensed languages and subtitle languages; the registration authority 240 checks the validity/integrity of the provided RBC (i.e., the RBC has not been compromised or tampered with); the registration authority 240 adds a new block with the provided data and hashes (e.g., hashes 318, 319 for block 1 in FIG. 3) for information in the new block and preceding block, if the RBC 210 is valid; and the registration authority 240 returns the RBC 210 to the content provider 220, which returns the RBC 210 to user A.

Figure 7:
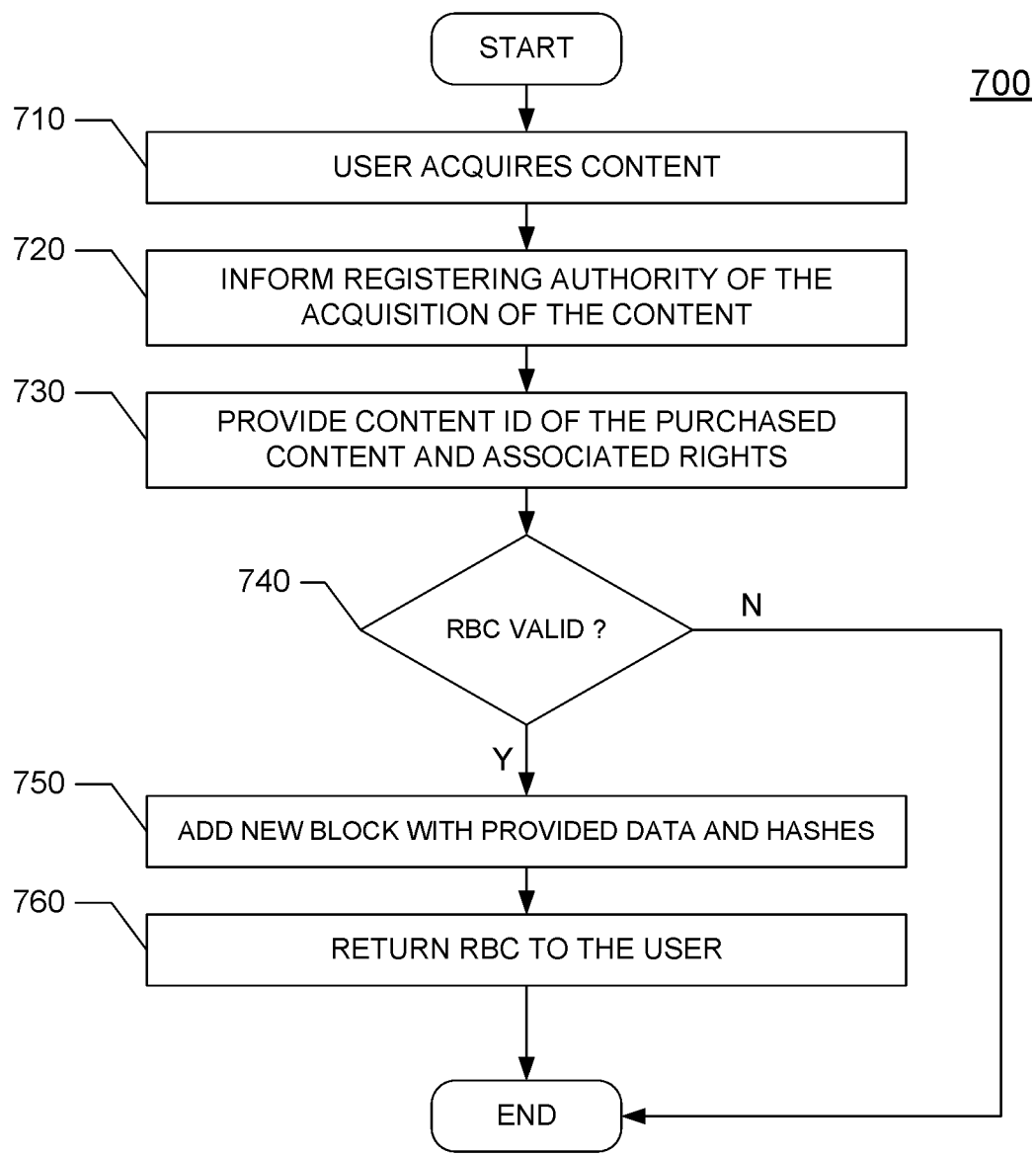
FIG. 7 is a flow diagram illustrating a process for acquiring a given content and adding usage rights to the RBC in accordance with one implementation of the present disclosure.

FIG. 7 is a flow diagram 700 illustrating a process for acquiring a given content and adding usage rights to the RBC in accordance with one implementation of the present disclosure. In the illustrated implementation of FIG. 7, when the user acquires the given content from the content provider, at block 710, the content provider informs the registration authority, at block 720, that the user acquired the content. The content provider provides the content ID of the purchased content and the associated usage rights, such as a list of licensed languages and subtitle languages, at block 730, to the registration authority. The registration authority then checks the integrity of the provided RBC, at block 740, and adds a new block with the provided data and hashes for information in the new block and the preceding block, at block 750, if the RBC is valid and has not been compromised or tampered with. The registration authority returns the RBC to the user, at block 760.

To package a content, in one implementation, the content provider 220 performs the following operations: registers this version of the content in the EIDR to receive the content ID (e.g., 312 for block 1); generates a random 128-bit number that will be the CW; calculates the corresponding encrypted CW 430 for each supported DRM by encrypting the CW with the corresponding DRM_KEY; scrambles the clear essence with the CW to generate the scrambled essence 420; and packages all this information into the protected content 250. In one implementation, the scrambling uses AES in the counter (CTR) mode. The protected content 250 can be freely distributed as it is self-protected.

Figure 8:
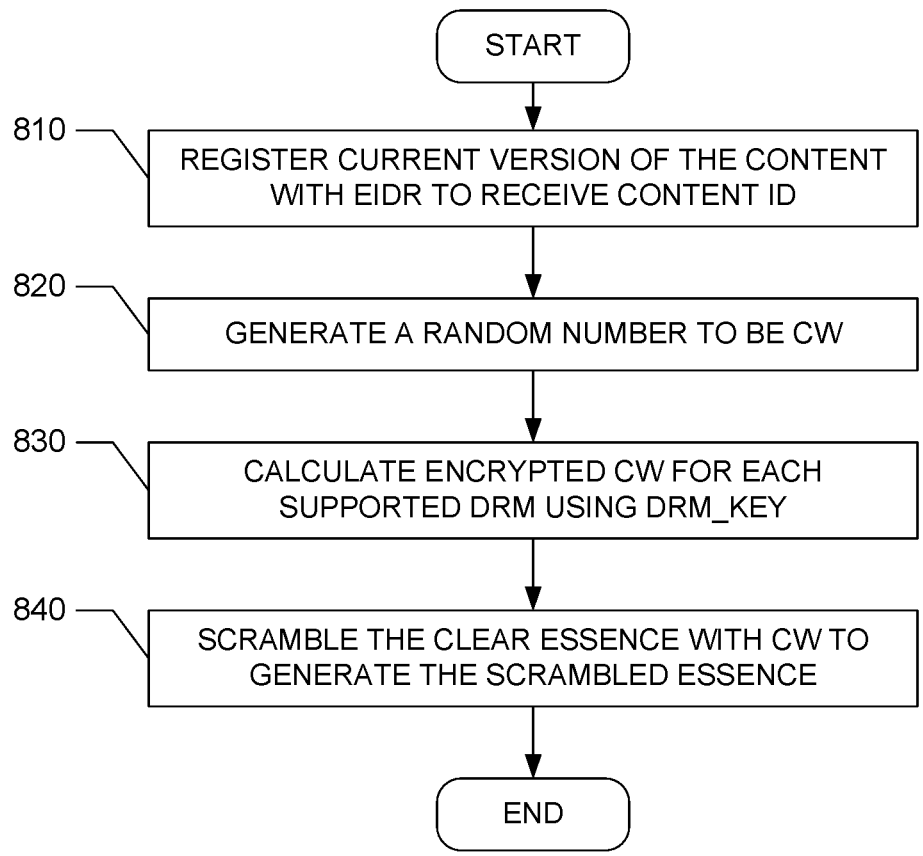
FIG. 8 is a flow diagram illustrating a process for packaging a content at the content provider in accordance with one implementation of the present disclosure.

FIG. 8 is a flow diagram 800 illustrating a process for packaging a content at the content provider in accordance with one implementation of the present disclosure. In the illustrated implementation of FIG. 8, the content provider registers a current version of the content in the EIDR to receive the content ID, at block 810. The content provider then generates a random number that will be the control word (CW), at block 820, and calculates the corresponding encrypted CW for each supported DRM by encrypting the CW with the corresponding secret key (DRM_KEY), at block 830. The content provider also scrambles the clear essence with the CW to generate the scrambled essence, at block 840, and packages all the information into the protected content.

To consume the content (e.g., watch the protected content), the following operations are performed by the DRM agent 260: receives from user A, the RBC 210 and the protected content 250; verifies the validity of the RBC 210; extracts the user ID 322; verifies whether user A has the private key corresponding to user ID 322 using a challenge-response protocol; checks whether the content ID (e.g., 312 for block 1) of protected content 250 is present in user A's RBC 210; verifies whether the usage rights (e.g., 314 for block 1) list the language and subtitle language requested by user A, if the content ID is present in user A's RBC 210; decrypts the encrypted CW 430 with its secret key DRM_KEY and retrieves the clear CW, if the usage rights verify; and descrambles and sends the scrambled essence 420 with the CW to user A for consumption.

In another implementation, the same RBC 210 works with several independent content providers 220. Each content provider 220 may use its own DRM Agent 260 or share a DRM Agent 260 with other providers.

Figure 9:
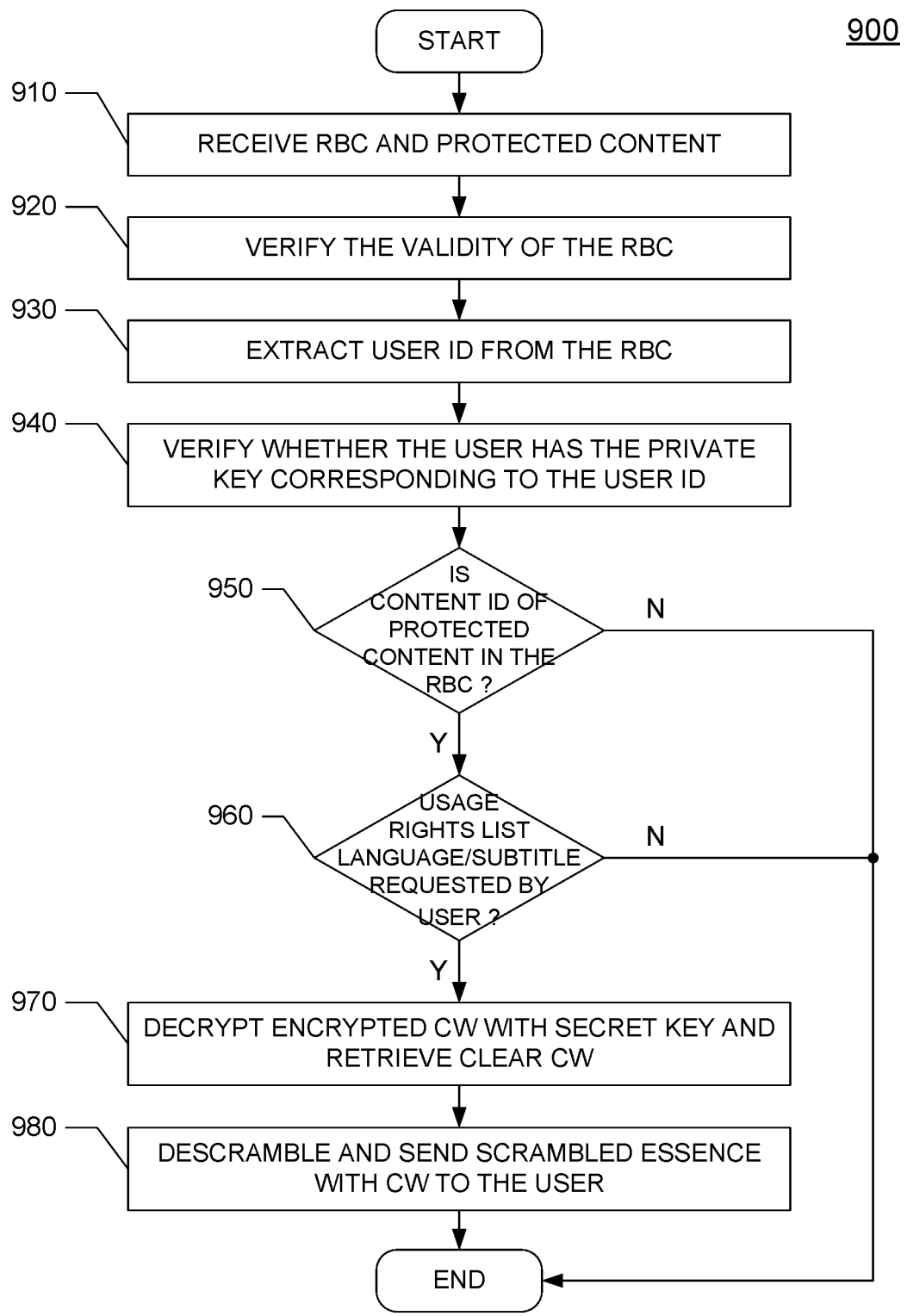
FIG. 9 is a flow diagram illustrating a process for consuming a content in accordance with one implementation of the present disclosure.

FIG. 9 is a flow diagram 900 illustrating a process for consuming a content in accordance with one implementation of the present disclosure. In the illustrated implementation of FIG. 9, the RBC and the protected content are received, at block 910, by the DRM agent and the validity of the RBC is verified, at block 920. The user ID is then extracted from the RBC, at block 930, and the DRM agent verifies whether the user has the private key corresponding to user ID using a challenge-response protocol, at block 940. At block 950, the content ID of the protected content is checked to determine whether it is present in the RBC. Then, at block 960, the DRM agent verifies whether the usage rights list the language and subtitle language requested by the user, if the content ID is present in the RBC. The DRM agent decrypts the encrypted CW with the secret key and retrieves the clear CW, at block 970, if the usage rights verify. The scrambled essence is descrambled and sent, at block 980, with the CW to the user for consumption.

Additional variations and implementations are also possible. For example, the content data can be for various types of content or other data, such as movies, television, video, music, audio, games, scientific data, medical data, etc. Various DRM and encryption algorithms can be used. User identification and association of rights can be handled in different ways, such as one user having the same or different rights on different devices, users sharing rights (e.g., family accounts or primary/subordinate accounts), temporary sharing of rights (e.g., lending, demo models). Accordingly, the specific examples discussed herein are not the only implementations within the scope of the new technology.

One implementation includes one or more programmable processors and corresponding computer system components store and execute computer instructions, such as to provide the creation, storage, modification, and transmission of data representing blockchains and content, and the management of information to control the encryption, decryption, and access to data representing content.

The above description of the disclosed implementations is provided to enable any person skilled in the art to make or use the disclosure. Various modifications to these implementations will be readily apparent to those skilled in the art, and the generic principles described herein can be applied to other implementations without departing from the spirit or scope of the disclosure. Accordingly, the techniques are not limited to the specific examples described above. Thus, it is to be understood that the description and drawings presented herein represent a presently possible implementation of the disclosure and are therefore representative of the subject matter that is broadly contemplated by the present disclosure. It is further understood that the scope of the present disclosure fully encompasses other implementations that may become obvious to those skilled in the art and that the scope of the present disclosure is accordingly limited by nothing other than the appended claims.

The invention claimed is:

1. A method for generating a rights blockchain storing rights of a user, the method comprising:
   receiving, at a registration authority, an enrollment request and a public key from the user;
   verifying, at the registration authority, that the user has a private key corresponding to the public key;
   generating, at the registration authority, a user identifier using the public key;
   generating and delivering, at the registration authority, the rights blockchain having a genesis block including the user identifier to the user; and
   updating, at the registration authority, the rights blockchain including a new block having a content identifier of a protected content, associated usage rights, a hash of the new block, and a hash of a block subsequent to the new block,
   wherein the protected content includes the content identifier, a scrambled essence, and a control word, which is a random number generated by a content provider,
   wherein the scrambled essence is descrambled using the control word.

2. The method of claim 1, further comprising
   requesting a different public key when the public key is already registered.

3. The method of claim 1, further comprising
   receiving information from the content provider that the user has acquired the protected content having the content identifier.

4. The method of claim 1, wherein the associated usage rights include
   a list of licensed languages and subtitle languages.

5. An apparatus for generating a rights blockchain storing rights of a user, the apparatus comprising:
   means for receiving an enrollment request and a public key from the user,
   means for verifying that the user has a private key corresponding to the public key,
   means for generating a user identifier using the public key,
   means for generating and delivering the rights blockchain having a genesis block including the user identifier to the user, and
   means for updating the rights blockchain including a new block having a content identifier of a protected content, associated usage rights, a hash of the new block, and a hash of a block subsequent to the new block,
   wherein the protected content includes the content identifier, a scrambled essence, and a control word, which is a random number generated by a content provider,
   wherein the scrambled essence is descrambled using the control word.

6. The apparatus of claim 5, further comprising
   wherein the content provider informs a registration authority that the user has acquired a content.

7. The apparatus of claim 6, further comprising
   means for receiving and updating the rights blockchain with a new block having a content identifier of the content and associated usage rights.

8. The apparatus of claim 7, wherein the content provider is also configured to scramble the content corresponding to the content identifier in the updated rights blockchain and to generate a scrambled version of the content.

9. A method for performing digital rights management of a content using a rights blockchain storing rights of a user, the method comprising:
   receiving, at a DRM agent, a protected content including a content identifier, a scrambled essence, and an encrypted control word, which is a random number generated by a content provider,
   wherein the scrambled essence is an essence of the content scrambled using the encrypted control word to protect it from unauthorized uses;
   receiving, at the DRM agent, the rights blockchain and credentials of the user;
   searching, at the DRM agent, the rights blockchain for a first block that contains the content identifier of the protected content;
   decrypting, at the DRM agent, the encrypted control word when a signature and usage rights in the first block are determined to be valid; and
   descrambling, at the DRM agent, the scrambled essence using the decrypted control word to produce the essence of the content.

10. The method of claim 9, further comprising:
    performing, at the DRM agent, an integrity check of the rights blockchain to determine that the rights blockchain has not been compromised or tampered with.

11. The method of claim 9, wherein the rights blockchain includes a genesis block having a user identifier of the user, and the credentials of the user are cryptographically linked to the user identifier.

12. The method of claim 9, further comprising
    determining, at the DRM agent, whether the signature and the usage rights of the first block are valid.

13. A method for generating a rights blockchain storing rights of a user to consume an item of content, the method comprising:
    receiving, at a registration authority, an enrollment request and a public key from the user and verifying that the user has a private key corresponding to the public key;
    generating, at a registration authority, a genesis block including a user identifier of the user using the public key; and
    generating and adding, at a registration authority, a new block having a content identifier of the item of content, associated usage rights, a hash of the new block, and a hash of a block subsequent to the new block,
    wherein the item of content also includes a content identifier, a scrambled essence, and a control word, which is a random number generated by a content provider, and
    wherein the scrambled essence is descrambled using the control word.

* * * * *